3,318,873
6-SPIRO OXIRANE STEROIDS OF THE ANDROSTANE SERIES

James F. Kerwin, Broomall, Pa., assignor to Smith Kline & French Laboratories, Philadelphia, Pa., a corporation of Pennsylvania
No Drawing. Filed Jan. 11, 1965, Ser. No. 424,806
5 Claims. (Cl. 260—239.55)

This invention relates to new steroid compounds having at the 6-position thereof a spiro oxirane ring.

The object of the present invention is to provide new steroid compounds having enhanced hormonal and antihormonal activities with minimal side effects.

The compounds of the present invention are represented by the following formula:

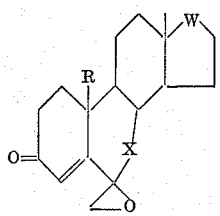

wherein:

R is hydrogen or methyl;
X is a single bond or methylene; and
W is carbonyl, β-hydroxymethylene, β-lower alkanoyloxymethylene, β-(1-cycloalkenyloxy)methylene, β-hydroxy-α-lower alkylmethylene, β-lower alkanoyloxy-α-lower alkylmethylene, β-phenyl lower alkanoyloxymethylene, or β-cycloalkyl lower alkanoyloxymethylene.

The compounds are thus estr-4-en-3-ones and androst-4-en-3-ones and their B-nor analogs, having various substituents at the 17-position, and characterized most distinctively by the presence of a spiro oxirane ring at the 6-position.

The term lower alkanoyl, when used in the present specification, is intended to represent those groups having up to five or six carbon atoms. They thus include, for example, acetyl, propionyl, butyryl, and valeryl.

The term lower alkyl, when used in the present specification, is intended to represent a methyl or an ethyl group.

The terms 1-cycloalkenyl and cycloalkyl are intended to represent those groups having 5 or 6 carbon atoms therein, such as cyclopentyl, cyclohexyl, 1-cyclopentenyl, or 1-cyclohexenyl.

The compounds of the invention are prepared by epoxidizing a 6-methylene steroid with a reagent such as m-chloroperbenzoic acid. The steroid is dissolved in a solvent such as chloroform, which is inert to the peracid, the peracid is then added, and the solution is allowed to stand at room temperature for two to four days. The excess peracid is removed by washing the solution sequentially with potassium iodide solution, sodium bisulfite solution, and then sodium bicarbonate solution. The product is then isolated and chromatographed over neutral alumina.

Other peracids such as perbenzoic, perphthalic, or o- or p-chloroperbenzoic may be employed. Solvents such as ethyl acetate, ether, or methylene chloride are useful.

The spiro(androst-4-en-3-one-6,2'-oxiranes) and spiro(estr-4-en-3-one-6,2'-oxiranes) of the present invention are anabolic and androgenic agents, while the corresponding B-nor compounds are antiandrogenic agents. As an example, the compound spiro(17β-acetoxyandrost-4-en-3-one-6,2'-oxirane) possesses anabolic and androgenic activity.

The 1-cycloalkenyl ethers of the invention are prepared by heating the 17-alcohol with a ketal of the appropriate cycloalkanone, e.g. the diethyl ketal of cyclopentanone to about 120–140°, slowly raising the temperature, and allowing the alcohol to distill out until the temperature reaches about 175–185° C. The residue is crystallized from methanol containing a little pyridine or from ether-petroleum ether.

The starting materials for the preparation of the compounds of the present invention are known to the art or are described in British Patent 944,050 and Tetrahedron 20, 597 (1964).

The following examples are illustrative of the compounds of the invention, but are not to be considered as limitative of the scope thereof.

EXAMPLE 1

*Spiro(17β-hydroxyandrost-4-en-3-one-6,2'-oxirane)*

To a solution of 2.0 g. (5.84 mmoles) of 6-methylene-17β-acetoxyandrost-4-en-3-one in 60 ml. of chloroform is added all at once 2.06 g. (10.1 mmoles) of m-chloro perbenzoic acid (85% minimum assay), and the solution allowed to stand at room temperature for about seventy-two hours. The solution is then washed with a potassium iodide solution, sodium bi-sulfite solution, and then 5% sodium bicarbonate solution. After washing thoroughly with water, the chloroform is dried and then evaporated in vacuo. The residual syrup is chromatographed over Woelm neutral alumina, activity III, most of the product being eluted with benzene to 20% methylene chloride in benzene. The homogeneous fractions are recrystallized from aqueous acetone to give spiro(17β-acetoxyandrost-4-en-3-one-6,2'-oxirane), M.P. 127–129°.

A solution of 0.5 g. of the above acetate in 30 ml. of methanol is heated to reflux and a solution of 0.16 g. of potassium hydroxide in 5 ml. of water is added over a 30 minute period. After refluxing for two hours, the solution is cooled, poured into ten volumes of water, and the mixture extracted with methylene chloride. The organic extracts are dried and evaporated to give the title product.

EXAMPLE 2

*Spiro(B-norandrost-4-ene-3,17-dione-6,2'-oxirane)*

To a stirred suspension of 20 g. of lithium aluminum hydride in 700 ml. of tetrahydrofuran under a nitrogen atmosphere is slowly added 30 g. of 3β-acetoxy-5β-hydroxy-17-oxo-B-norandrostan-6-oic acid 5,6-lactone [Tanabe et al., Chem. Pharm. Bull., 9, 12 (1961)] in 250 ml. of tetrahydrofuran. After addition is complete, the reaction mixture is stirred at reflux for 2 hours. After cooling with an ice bath the reaction mixture is slowly treated with 80 ml. of water in 100 ml. of tetrahydrofuran. The resulting white precipitate is removed by filtration and washed with fresh tetrahydrofuran. Evaporation of the filtrate gives a residue of 6β-hydroxymethyl-3β,5β,17β-trihydroxy-B-norandrostane, M.P. 166–170° C. after crystallization from ethyl acetate.

To a stirred solution of 60 g. of N-bromoacetamide in 1 l. of methanol, protected from direct light, is added 18 ml. of pyridine, 60 ml. of water and 18 g. of 6β-hydroxymethyl-3β,5β,17β-trihydroxy-B-norandrostane. After stirring at room temperature for 16 hours, 40 g. of solid sodium sulfite followed by 400 ml. of water is added, stirring is continued for a few minutes, and finally the reaction mixture is concentrated to 500 ml. at reduced pressure. The warm mixture is diluted with 1.5 l. of water, cooled, and filtered to give crystalline 6β-hydroxymethyl-5β-hydroxy-B-norandrostane-3,17-dione, M.P. 178–180° C. after recrystallization from ethyl acetate.

A solution of 5 g. of 6β-hydroxymethyl-5β-hydroxy-B-norandrostane-3,17-dione in 500 ml. of benzene containing 0.5 g. of p-toluenesulfonic acid is stirred at room temperature under nitrogen for 10 hours. The reaction mixture is washed with dilute aqueous sodium carbonate solution, dried, and evaporated to a residue of 6-methylene-B-norandrost-4-ene-3,17-dione which after recrystallation from methanol has M.P. 143–148° C., uv: $\lambda_{max}$. 283 mμ (ε15,500)

To a solution of 1.65 g. (5.8 mmoles) of 6-methylene-B-norandrost-4-ene-3,17-dione in 60 ml. of chloroform is added all at once 2.06 g. (10.1 mmoles) of m-chloroperbenzoic acid, and the solution allowed to stand at room temperature for about seventy-two hours. The reaction mixture is then worked up and purified as in Example 1 to give the title product.

EXAMPLE 3

*Spiro(17β-hydroxy-B-norandrost-4-en-3-one-6,2'-oxirane)*

To a stirred suspension of 1.7 g. of lithium aluminum hydride in 85 ml. of ether is slowly added 6.8 g. of spiro-(B-norandrost-4-ene-3,17-dione-6,2'-oxirane) in 110 ml. of dry tetrahydrofuran. The reaction mixture is then refluxed for two hours, cooled, treated with 7 ml. of water in 20 ml. of tetrahydrofuran, filtered, and the filtrate evaporated to give the 3,17β-diol. The diol is dissolved in 100 ml. of dioxane and treated with 5.7 g. of 2,3-dichloro-5,6-dicyano-benzoquinone in 70 ml. of dioxane. After being allowed to sit at room temperature for five hours, the mixture is filtered and then evaporated. The residue is dissolved in 1:1 methylene chloride-benzene and then chromatographed on 200 g. of Woelm alumina, activity III. Elution with 1:1 methylene chloride-benzene and methylene chloride gives spiro(17β-hydroxy-B-norandrost-4-en-3-one-6,2'-oxirane).

EXAMPLE 4

The following compounds are prepared by treating 5.8 mmoles of the corresponding 6-methylene steroid with 2.06 g. of m-chloroperbenzoic acid according to the procedure of Example 1.

Spiro(17β-acetoxy-17α-methylandrost-4-en-3-one-6,2'-oxirane)
Spiro(17β-acetoxyestr-4-en-3-one-6,2'-oxirane)
Spiro(androst-4-ene-3,17-dione-6,2'-oxirane)
Spiro(17β-propionyloxyestr-4-en-3-one-6,2'-oxirane)
Spiro[17β-(3-phenylpropionyloxy)androst-4-en-3-one-6,2'-oxirane]

The following compounds are prepared by hydrolyzing the corresponding acetates with aqueous methanolic potassium hydroxide according to the procedure of Example 1.

Spiro(17β-hydroxy-17α-methylandrost-4-en-3-one-6,2'-oxirane)
Spiro(17β-hydroxyestr-4-en-3-one-6,2'-ozirane)

Re-esterification of any of the hydroxy compounds is readily accomplished by procedures known to the art, including treatment with acetic anhydride, propionic anhydride, butyryl chloride, 3-phenylpropionyl chloride, or 3-cyclopentylpropionyl chloride in combination with a base such as pyridine.

EXAMPLE 5

*Spiro[17β-(1-cyclopentenyloxy)androst-4-en-3-one-6,2'-oxirane]*

A suspension of 15.7 g. (0.05 mole) of spiro-(17β-hydroxyandrost-4-en-3-one-6,2'-oxirane) in 65 ml. of the diethyl ketal of cyclopentanone is heated to 130° and the temperature slowly raised over a period of 4–5 hours to 190° so as to maintain a slow distillation. Then the mixture is heated at 195–205° for an hour to drive off most of the solvent. On cooling, a few drops of pyridine are added and crystallization is induced either by cooling, triturating with methanol (containing a little pyridine) or, if necessary, by triturating with aqueous methanol (containing pyridine). Recrystallization from methanol (pyridine) gives the pure cyclopentenyl ether.

I claim:

1. A steroid of the formula:

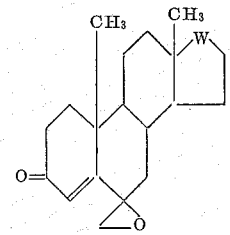

where W is selected from the group consisting of carbonyl, β-hydroxymethylene, β-lower alkanoyloxymethylene, β-(1-cycloalkenyloxy)methylene, β-hydroxy - α - lower alkylmethylene, β-lower alkanoyloxy-α-lower alkylmethylene, β-phenyl lower alkanoyloxymethylene, and β-cycloalkyl lower alkanoyloxy-methylene.

2. A steroid of the formula:

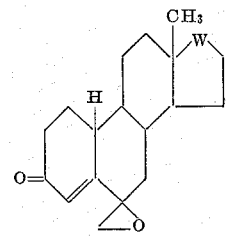

where W is selected from the group consisting of β-hydroxymethylene, β-lower alkanoyloxymethylene, β-(1-cycloalkenyloxy)methylene, β-phenyl lower alkanoyloxymethylene, and β-cycloalkyl lower alkanoyloxymethylene.

3. Spiro(17β - lower alkanoyloxyandrost - 4 - en - 3-one-6,2'-oxirane).

4. Spiro(17β - hydroxyandrost - 4 - en - 3 - one - 6,2'-oxirane).

5. Spiro(17β-acetoxyandrost-4-en-3-one-6,2'-oxirane).

No references cited.

LEWIS GOTTS, *Primary Examiner.*

ELBERT L. ROBERTS, *Examiner.*